United States Patent [19]

Johnson et al.

[11] 4,363,666

[45] Dec. 14, 1982

[54] REINFORCED CEMENT SHEET PRODUCT CONTAINING FIBERS OTHER THAN ASBESTOS, CLAY AND THICKENER

[75] Inventors: Robert M. Johnson; Elmer M. Melling, both of Kenmore, N.Y.

[73] Assignee: National Gypsum Company, Dallas, Tex.

[21] Appl. No.: 233,687

[22] Filed: Feb. 11, 1981

[51] Int. Cl.³ .................................................. C04B 7/35
[52] U.S. Cl. ........................................ 106/90; 106/93; 106/99
[58] Field of Search .................................. 106/97–99, 106/120, 90

[56] References Cited

U.S. PATENT DOCUMENTS

| | | | |
|---|---|---|---|
| 3,645,961 | 2/1972 | Goldfein | 106/99 |
| 3,716,386 | 2/1973 | Kempster | 106/99 |
| 3,753,749 | 8/1973 | Nutt | 106/99 |
| 4,040,851 | 8/1977 | Zeigler | 106/99 |
| 4,101,335 | 7/1978 | Barrable | 106/99 |
| 4,111,710 | 9/1978 | Pairaudeau et al. | 106/99 |
| 4,132,555 | 1/1979 | Barrable | 106/120 |
| 4,199,366 | 4/1980 | Schaefer et al. | 106/99 |

*Primary Examiner*—James Poer
*Attorney, Agent, or Firm*—Joseph P. Gastel

[57] ABSTRACT

A fiber cement product consisting essentially by weight of a Portland cement binder in the amount of between about 40% and 80%, natural and/or synthetic fibers in an amount of between 1% and 15%, clay in an amount of between about 2% and 15%, and thickener in an amount of between about 0.03% and 0.5%. The product may also contain silica and/or filler in an amount of between about 10% and 40% by weight. The silica is generally used in a product which is to be autoclaved. The filler may be waste fiber-cement product or inert filler material.

28 Claims, No Drawings

REINFORCED CEMENT SHEET PRODUCT CONTAINING FIBERS OTHER THAN ASBESTOS, CLAY AND THICKENER

BACKGROUND OF THE INVENTION

The present invention relates to a reinforced cement sheet product which does not contain asbestos but which contains other fibers and the combination of clay and thickener so as to permit satisfactory fabrication thereof on a machine in which a slurry is formed on a screen and subsequently vacuum-filtered through a screen and/or felt.

By way of background, in the past asbestos-cement compositions have been formed into products such as siding shingles, flat sheets, corrugated sheet products, and the like. These sheets generally contained Type 1 Portland cement binder in the amount of about 55%, silica and/or filler in the amount of about 30%, and asbestos fibers in the amount of about 15%. The products had many desirable qualities, including high strength, exterior durability, easy application, and the ability to be colored in various colors. In addition, the existence of asbestos provided formation of a suitable "filter mat" which resulted in (1) slowing down the drainage rate and (2) a low percent of solids loss of the various fines during manufacture. The high drainage time permitted the product to be formed properly during fabrication, and the low solids loss resulted in a stronger product because relatively little of the cement fines were lost. In addition, asbestos has always displayed the unique characteristic of good dispersion in a cementitious/water slurry because of its hydrophilic nature. This means that the asbestos fibers intimately mixed with the cement particles and remained in suspension without settling out or floating to the top of the slurry. However, in recent years governmental regulations have restricted the use of asbestos due to its carcinogenic effects. Therefore, attempts have been made to find substitutes for asbestos. However, various other fibers were not capable, without further modification in formulation, of forming suitable filter mat from the slurry, and providing a relatively high drainage time and a relatively low solids loss during fabrication. One such attempt is disclosed in U.S. Pat. No. 4,040,851 which utilizes cotton fibers instead of asbestos fibers, along with Portland cement, silica, and hydroxyethyl cellulose thickener. However, a formula of this type has not been found to have a desirable combination of sufficiently high drainage time and a sufficiently low solids loss. It has also been found that various synthetic fibers, such as polyethylene, polypropylene, etc. and some natural fibers cannot be used instead of asbestos because they will not disperse properly in the cement-silica water slurry. In this respect, they tend to float to the top of the slurry because they have a lower specific gravity than water, and therefore they will not form a homogeneous mat on the cylinder of a wet forming machine. It is with overcoming the foregoing deficiencies of the prior art that the present invention is concerned.

SUMMARY OF THE INVENTION

It is accordingly one important object of the present invention to provide fiber-cement products containing no asbestos which during formation have a sufficiently high drainage time and a sufficiently low solids loss when a slurry is formed on a screen and vacuum-filtered through a felt so as to cause the product to be formed properly and to have highly desirable strength and durability properties.

Another object of the present invention is to provide a cement-fiber product in which the fibers are properly dispersed in the slurry from which the product is formed. Other objects and attendant advantages of the present invention will readily be perceived hereafter.

The improved fiber-cement product of the present invention comprises by weight Portland cement in an amount of between about 40% and 80%, fibers in an amount of between about 1% and 15%, a thickener, and clay in an amount of between about 2% and 15% to coact with said thickener in an aqueous slurry containing said Portland cement and fibers to provide a sufficiently high drainage time for proper formation of a mat on a screen and a smaller solids loss than can be obtained by the use of said thickener by itself. The product may also contain silica and/or filler in an amount of between about 10% and 40% by weight. The filler may be waste fiber-cement product or inert filler material. If the product is to be autoclaved, silica is normally used in combination with cement. The various aspects of the present invention will be more fully understood when the following portions of the specification are read.

DESCRIPTION OF THE PREFERRED EMBODIMENTS

The improved fiber-cement product of the present invention is a fiber-reinforced cementitious hydrated reaction product of a cured mixture of Portland cement, fibers, clay and thickener. The product preferably also includes filler as a matter of economy, but it can be made without filler. The filler may be reground waste fiber-cement product or inert fillers. If the product is to be autoclaved, silica is added in combination with the cement. The product, as noted above, is intended to be used for the same purposes as asbestos-cement products, namely, as siding for houses, roofing, slabs, corrugated sheets, flat sheets and the like.

It is preferred that Type I Portland cement be used, but Type 2 or any other conventional type may be used. The cement may be present in an amount of between about 40% and 80% by weight, and more preferably between about 45% and 75% by weight, although the most preferred range is between about 55% and 65% by weight where silica and/or filler is used.

Fillers may form a part of the composition. The fillers may be inert substances, such as reground product, calcium carbonate, or any other suitable substance. If the product is to be autoclaved, silica is used by itself or in combination with filler. The silica and/or filler which is used is preferably 120 mesh but can be any other suitable mesh size between about 80 mesh and 325 mesh. The silica and/or filler can be present in the amount of between about 10% and 40% by weight, and more preferably between about 15% and 35% by weight, but the most preferred range is between about 20% and 35% by weight.

Fibers which can be used in the fiber-cement sheet products in accordance with the present invention are sisal, hemp, rami, jute, Kraft, glass, alumina, carbon, mineral fiber, polypropylene, aramid and cotton. Any of the foregoing fibers, or others, may be present in an amount of between about 1% and 15% by weight, and more preferably between about 2% and 10% by weight, and most preferably between about 5% and 7% by weight. The fibers can be used by themselves or in combination with other fibers. The fibers may be of any suitable length, but the preferred length is between about ⅛ inch and ¼ inch, and the preferred denier for synthetic fibers is about 3 denier but the denier may range anywhere between about 0.5 and 8.

The clay which is preferred is Attapulgus type which is known commercially as Engelhard X2059. However, other clays are also satisfactory. These clays include bentonite and kaolin types, and Bentone LT, Attagel 40, Minngel FG, and Imvite IGBA. The clay increases the drainage time and aids in keeping the fibers in suspension during the sheet formation process. In other words, the clay prevents the fibers from floating to the top or settling to the bottom. The clay may be present in an amount of between about 2% and 15% by weight, and more preferably between about 3% and 10% by weight, and most preferably between about 4% and 7% by weight.

Various types of thickeners can be used. These thickeners may include hydroxyethyl cellulose (such as TJC 500 or Natrosol 250), Kelgin alginate, carboxymethyl cellulose, or poly(ethylene oxide) (such as POLYOX WSR-301 or any other grade having a molecular weight anywhere between 600,000 and 5,000,000.) The thickener may be present in an amount of between about 0.03% and 0.5% by weight, and more preferably between about 0.04% and 0.3% by weight and most preferably between about 0.05% and 0.1% by weight.

The combination of clay and thickener in the fiber-cement boards of the present invention provides a combination of two desirable characteristics. The first is a relatively long drainage time for the water to seep through the mat as it is formed on a screen or felt, and this provides more time for the product to be handled during formation, without adverse effects. It also allows a wetter lamination for improved plybond on a wet forming machine. The second characteristic of the combination of clay and thickener is that there is a relatively low solids loss during drainage of the water from the product which is being formed. The low solids loss causes a stronger product to be produced because it results in the retention of the fines in the board, and especially the cement fines which are the finest particles in the mixture, considering that it is the cement which produces binding of all of the components to form the board. The foregoing two factors are required for proper formation of a product on a Hatschek machine or other types of machines where a slurry is wet-formed on a screen.

In Table A there is shown the drainage time and percent solids loss of fiber-cement boards which have been formulated with cement, silica, cotton, polypropylene and a thickener, but without clay.

TABLE A

| FORMULATIONS (IN %) | | | | |
|---|---|---|---|---|
| Cement | 60.4 | 60.4 | 60.4 | 60.4 |
| Silica | 33.5 | 33.5 | 33.5 | 33.5 |
| Cotton | 5.4 | 5.4 | 5.4 | 5.4 |
| Polypropylene | 0.6 | 0.6 | 0.6 | 0.6 |
| Clay | 0 | 0 | 0 | 0 |
| TJC 500 | 0.1 | 0 | 0 | 0 |
| Polyox 301 | 0 | 0.1 | 0 | 0 |
| Kelgin Alginate | 0 | 0 | 0.1 | 0 |
| CMC | 0 | 0 | 0 | 0.1 |
| Drainage Time (Seconds) | 37 | 16 | 13 | 15 |
| % Solids Loss | 15.3 | 10.8 | 11.6 | 26.5 |

The TJC 500 is a hydroxyethyl cellulose product of the Union Carbide Corp.

The POLYOX 301 is poly(ethylene oxide) has a molecular weight of 4,000,000 and is manufactured by the Union Carbide Corp.

Kelgin Alginate is alginic acid salt and is a product of the Kelco Company.

The CMC is carboxymethyl cellulose, and is a product of Hercules Inc.

In Table B there is shown the drainage time and percent solids loss of cement-fiber boards containing cement, silica, cotton, polypropylene, thickener and clay.

TABLE B

| FORMULATIONS (IN %) | | | | | | | | |
|---|---|---|---|---|---|---|---|---|
| Cement | 55.4 | 57.5 | 57.5 | 57.5 | 57.5 | 57.9 | 57.9 | 57.9 |
| Silica | 30.8 | 31.9 | 31.9 | 31.9 | 3.19 | 32.1 | 32.1 | 32.1 |
| Cotton | 0 | 5.1 | 5.1 | 5.1 | 5.1 | 5.1 | 5.1 | 5.1 |
| Polypropylene | 0 | 0.6 | 0.6 | 0.6 | 0.6 | 0 | 0 | 0 |
| Asbestos | 13.8 | 0 | 0 | 0 | 0 | 0 | 0 | 0 |
| Clay | 0 | 4.8 | 4.8 | 4.8 | 4.8 | 4.8 | 4.8 | 4.8 |
| TJC 500 | 0 | 0.1 | 0 | 0 | 0 | 0 | 0 | 0 |
| Natrosol 250 | 0 | 0 | 0.1 | 0 | 0 | 0 | 0 | 0 |
| Polyox 205 | 0 | 0 | 0 | 0.1 | 0 | 0 | 0 | 0 |
| Polyox 301 | 0 | 0 | 0 | 0 | 0.1 | 0 | 0 | 0 |
| Kelgin alginate | 0 | 0 | 0 | 0 | 0 | 0.1 | 0 | 0 |
| CMC Carboxymethyl Cellulose | 0 | 0 | 0 | 0 | 0 | 0 | 0.14 | 0.28 |
| Drainage Time (Seconds) | 46 | 30 | 33 | 75 | 34 | 43 | 45 | 80 |
| % Solids Loss | 1.8 | 8.1 | 7.0 | 3.6 | 0.6 | 5.7 | 4.6 | 4.2 |

The POLYOX 205 is a poly(ethylene oxide) having a molecular weight of 600,000 and is a product of the Union Carbide Corp.

The NATROSOL 250 is a hydroxyethyl cellulose and is a product of Hercules Inc.

A comparison of Table A and Table B shows that there is a lower solids loss and also generally a higher drainage time when clay is used in conjunction with a thickener. These properties of higher drainage time and lower solids loss relate to the operability of an aqueous slurry on a wet forming machine. In addition, it was observed that the addition of the clay resulted in a more uniform dispersion of the fibers in the slurry.

In preparing the compositions listed above in both Table A and Table B, a standard amount of slurry containing 13.5% solids by weight was drained through a 50 mesh screen under 2½ inches of mercury vacuum. The drainage time in seconds is the time for the vacuum to break. The filtrate was collected and the percent solids in the filtrate was measured.

The compositions of Table A and Table B were prepared by the following procedure in the laboratory: A weighed amount of fiber was predispersed in 1,000 ml of water in a Waring blender at low speed for one minute. The fiber dispersion was transferred to a beaker fitted with a laboratory-type propeller mixer. The dry ingredients (cement and/or filler) and the clay, as a water dispersion, were added to the beaker with agitation, and the resultant slurry was agitated for two minutes. Fifteen seconds before cessation of agitation, the required amount of thickener was added as a solution. The resultant slurry was poured into a standard Rotap 8″ diameter 50 mesh sieve and subjected to a vacuum of 2½″ of mercury. The drainage time was taken as the point of vacuum break. The discharged water was collected and the solids lost in the discharge water were measured.

It can thus be seen that the present invention is manifestly capable of achieving the above enumerated objects, and while preferred embodiments of the present invention have been disclosed, it will be understood that the present invention is not limited thereto but may be otherwise embodied within the scope of the following claims.

What is claimed is:

1. A fiber-cement product comprising by weight Portland cement in an amount of between about 40% and 80%, fibers other than asbestos in an amount of between about 1% and 15%, a thickener, and clay in an amount of between about 2% and 15% to coact with said thickener in an aqueous slurry containing said Portland cement and fibers to provide a sufficiently high drainage time for proper formation of a mat on a screen and a smaller solids loss than can be obtained by the use of said thickener by itself.

2. A fiber-cement product as set forth in claim 1 including silica in an amount of between about 10% and 40% by weight.

3. A fiber-cement product as set forth in claim 1 including filler in an amount of between about 10% and 40% by weight.

4. A fiber-cement product as set forth in claim 1 including a combination of silica and filler in an amount of between about 10% and 40% by weight.

5. A fiber-cement product as set forth in claim 1 wherein said thickener is present in an amount of between about 0.03% and 0.5% by weight.

6. A fiber-cement product as set forth in claim 1 wherein said thickener is present in an amount of between about 0.04% and 0.3% by weight.

7. A fiber-cement product as set forth in claim 1 wherein said thickener is present in an amount of between about 0.05% and 0.1% by weight.

8. A fiber-cement product as set forth in claim 1 wherein said clay is present in an amount of between about 3% and 10% by weight.

9. A fiber-cement product as set forth in claim 8 wherein said thickener is present in an amount of between about 0.03% and 0.5% by weight.

10. A fiber-cement product as set forth in claim 8 wherein said thickener is present in an amount of between about 0.04% and 0.3% by weight.

11. A fiber-cement product as set forth in claim 8 wherein said thickener is present in an amount of between about 0.05% and 0.1% by weight.

12. A fiber-cement product as set forth in claim 1 wherein said clay is present in an amount of between about 4% and 7% by weight.

13. A fiber-cement product as set forth in claim 12 wherein said thickener is present in an amount of between about 0.03% and 0.5% by weight.

14. A fiber-cement product as set forth in claim 12 wherein said thickener is present in an amount of between about 0.04% and 0.3% by weight.

15. A fiber-cement product as set forth in claim 12 wherein said thickener is present in an amount of between about 0.05% and 0.1% by weight.

16. A fiber-cement product as set forth in claim 1 wherein said fibers are selected from the group of cotton, sisal, rami, jute, hemp, Kraft, glass, alumina, carbon, mineral fiber, polypropylene, aramid and cotton.

17. A fiber-cement product as set forth in claim 1 wherein said Portland cement is present in an amount of between about 55% and 65% by weight, and wherein said fibers are present in an amount of between about 5% and 7% by weight, and wherein said clay is present in an amount of between about 4% and 7% by weight, and wherein said thickener is present in an amount of between about 0.05% and 0.1% by weight.

18. A fiber-cement product comprising by weight Portland cement in an amount of between about 40% and 80%, fibers in an amount of between about 1% and 15%, a thickener, and clay in an amount of between about 2% and 15% to coact with said thickener in an aqueous slurry containing said Portland cement and fibers to provide a lesser solids loss than can be obtained by the use of said thickener by itself.

19. A fiber-cement product as set forth in claim 1 wherein said thickener is present in an amount of at least about 0.03% by weight.

20. A fiber-cement product as set forth in claim 1 wherein said clay is of the Attapulgus type.

21. A fiber-cement product comprising Portland cement in an amount of between about 40% and 80% by weight, fibers other than asbestos, and clay and thickener in relatively sufficient amounts to maintain said fibers in suspension in an aqueous slurry containing said fibers and Portland cement and to provide a lesser solids loss than can be obtained by the use of said thickener by itself.

22. A fiber-cement product as set forth in claim 21 wherein said clay is present in an amount of at least 2% by weight.

23. A fiber-cement product as set forth in claim 22 wherein said clay is of the Attapulgus type.

24. A fiber-cement product as set forth in claim 22 wherein said thickener is present in an amount of at least 0.03% by weight.

25. A fiber-cement product as set forth in claim 21 wherein said thickener is present in an amount of at least 0.03% by weight.

26. A fiber-cement product as set forth in claim 21 wherein said fibers are selected from the group of cotton, sisal, rami, jute, hemp, Kraft, glass, alumina, carbon, mineral fiber, polypropylene, aramid and cotton.

27. A fiber-cement product as set forth in claim 21 wherein said fibers are present in an amount of at least 1% by weight.

28. A fiber-cement product as set forth in claim 27 wherein said clay is present in an amount of at least 2% by weight and wherein said thickener is present in an amount of at least about 0.03% by weight.

* * * * *